Dec. 15, 1970        E. KUGLER        3,546,742
APPARATUS FOR PERFORATING THERMOPLASTIC FILM
Filed March 27, 1968
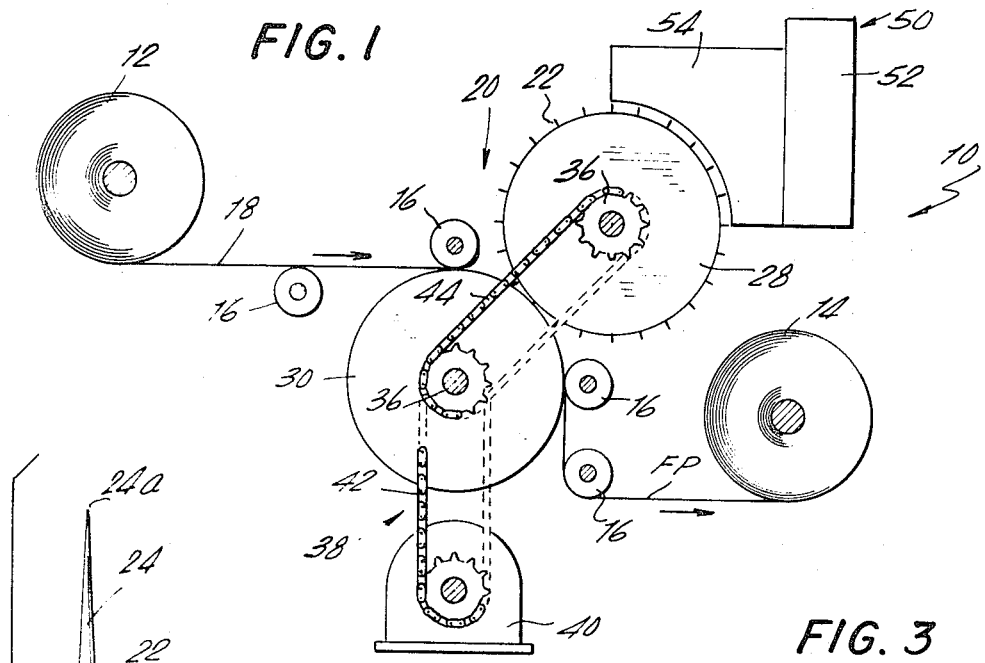
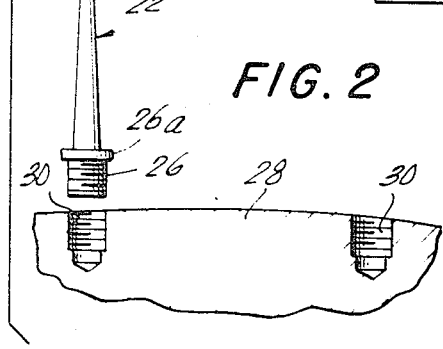
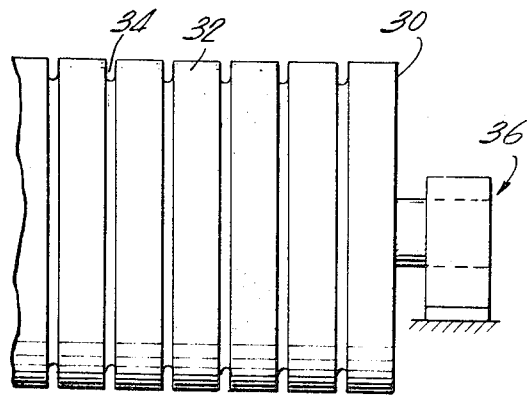
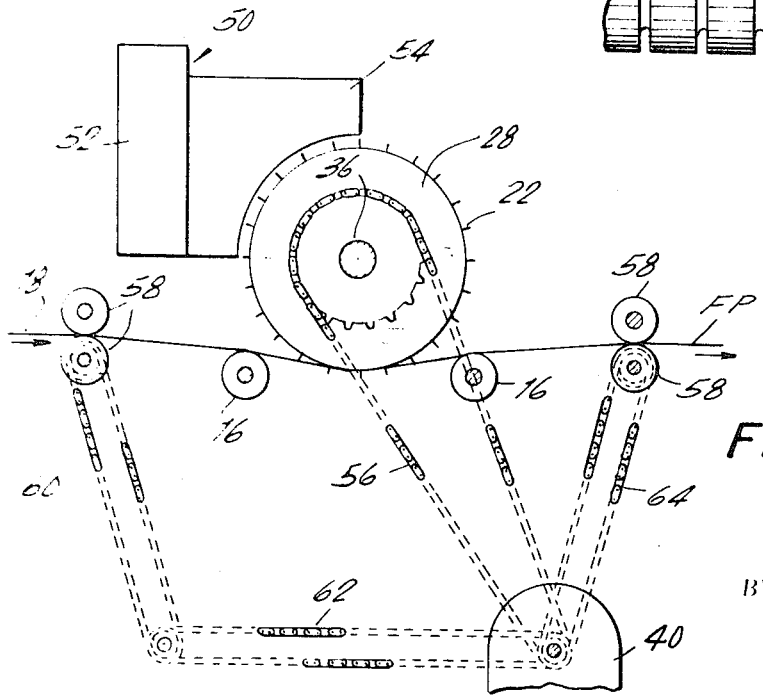
INVENTOR.
EMANUEL KUGLER
BY Amster & Rothstein
ATTORNEYS _United States Patent Office_

3,546,742
Patented Dec. 15, 1970

3,546,742
APPARATUS FOR PERFORATING
THERMOPLASTIC FILM
Emanuel Kugler, 124 Richmond Place,
Lawrence, N.Y. 11559
Filed Mar. 27, 1968, Ser. No. 716,459
Int. Cl. B26d 7/10; B26f 3/08
U.S. Cl. 18—10                                    6 Claims

ABSTRACT OF THE DISCLOSURE

An apparatus and method for forming perforations in thin, flexible thermoplastic material whereby film is transported to a work station and is engaged by a plurality of probes which are moved into the work station at spaced location and in timed relationship to the movement of the film. Prior to movement into the work station, the probes are heated by an induction heating unit such that the film material is perforated at the location of each probe.

---

The present invention relates generally to thermoplastic materials for use in the packaging industry and particularly to an apparatus and method for forming a plurality of small perforations in flexible thermoplastic film.

The use of thin, flexible thermoplastic film materials in packaging has increased tremendously in recent years. A major industry has arisen which was not even in existence 20 years ago. That industry is engaged in the manufacture of thin, flexible thermoplastic film materials for packaging purposes and the fabrication of the film material into packages.

One of the significant characteristics of the conventional film materials for packing purposes is, in some applications, a disadvantage. The film materials are basically airtight and waterproof. Thus, where it is desired that merchandise enclosed within the film material be ventilated or where it is desired that a liquid drain be provided in the package, the thermoplastic materials are less than perfect. One solution to the problems thus created has been to die cut a plurality of small holes in the thermoplastic material either during its manufacture or during its fabrication into packages. Although this procedure does provide a ventilated package, it too has certain disadvantages. Among these disadvantages is that the manufacturing operation is relatively expensive, the waste material is bothersome since it often remains stuck to the film and the resulting material is subject to easy destruction because it has many edges which can be torn.

Generally, it is an object of the present invention to provide a machine and method for the perforation of thin, flexible thermoplastic materials which eliminates the problems associated with die cutting. More particularly, it is an object of the invention to provide an improved method and apparatus for the perforation of thin, flexible thermoplastic materials which produces a superior product in an efficient and dependable manner.

In accordance with the present invention there is provided a device for forming a plurality of perforations in a web of thin, flexible thermoplastic material. The device comprises a plurality of spaced-apart probes, each of which has a relatively small cross-section compared to its length and induction heating means in association with the probes. There is provided in the apparatus means to define a flow path for movement of the thermoplastic material and drive means are provided to move the material to and through a work station in the flow path. Mounting means are provided for the probes to progressively move them from the induction heating means into the work path, At the work station, with a component of motion perpendicular to the plane of the material at that point. The induction heating means are operatively positioned with respect to the probes at a location remote from the work station such that the the probes are heated at one location and are operative upon the web of material at another location. Support and heat sink means may also be provided on the side of the work station opposite from the probes in order to support the web of material while it is being operated upon by the probes and in order to help define the extent of the size of the individual perforations formed in the material.

The invention also contemplates a method of forming perforations including the steps of transporting a web of thin, flexible thermoplastic material through a work station, induction heating a plurality of thin probes at a location remote from said work station, arranging said probes in a spaced relationship corresponding to the pattern of perforations to be formed in the thermoplastic material, progressively moving the probes into the plane occupied by the web of material at the work station thereby utilizing the heat introduced into the probes by the induction heating unit to melt the thermoplastic material in a desired pattern and continuously moving said probes and said material in timed relationship to each other to continuously perforate said material.

The above brief description, as well as further objects, features and advantages of the present invention, will be best appreciated by reference to the following detailed description of the invention when taken in conjunction with the accompanying drawings wherein:

FIG. 1 is an elevational view, generally in schematic form, of a machine in which a roll of thermoplastic material is guided through a work path, to a work station wherein it is perforated in accordance with the present invention;

FIG. 2 is an exploded view of a probe and a portion of the probe mounting drum in the device of FIG. 1; and FIG. 3 is a partial view of a grooved backup roller for use in the device of FIG. 1; and FIG. 4 is a partial elevational view of a portion of a device constituting a modification of the apparatus of FIG. 1 wherein there is no backup roller for the web of material as it goes through the work station.

Referring now specifically to FIG. 1 of the drawings, there is shown an apparatus generally designated by the numeral 10 in accordance with the present invention. A supply roll 12 is positioned at one end of the device 10 and the rewind roll 14 is positioned at the other end. A plurality of guiding means or guide rollers 16 are provided at various locations along the length of the apparatus to guide a web of thermoplastic material 18 from the supply roll 12 to the feed roll 14 along a flow path generally designated by the letters FP. The web of material 18 moves in the flow path FP in the direction of the arrows shown in FIG. 1.

Along the length of the flow path FP is a work station generally designated by the numeral 20. At the work station 20, means are provided to mount a series of heated probes which are used to perforate the web of material 18. A single probe 22 is shown in FIG. 2 and it includes a thin, pointed front portion 24 at one end and mounting means at the other. The mounting means for the probe 22 is a threaded base 26. At least the pointed end of the probe 22 is made of metal. In the particular embodiment of the invention shown in FIG. 1, the probes 22 are mounted on a cylindrical drum 28 which is appropriately journaled for rotation about its axis to bring individual probe 22 radially mounted along the outside cylindrical surface of the drum 28 into operative engagement with the web of material 18 at the work station 20. Specifically, the probes 22 are secured into a plurality of threaded wells 30 formed at spaced locations in the outer surface of the drum 28. The shoulders 26a of the probes 22 are engaged against the surface of the drum 28 thereby to ensure that the tips 24a of the probes are all positioned at the same radial distance from the axis of the drum 28. Since the web of material 18 is moved through the work station 20 at the same linear speed as the probes 22, the heated probes can penetrate into the material 18 and perforate it as both the material 18 and the drum 28 are moving. Of course, a large variety of other mounting means for the probes 22 are available. They can be mounted on a flexible conveyor which would be generally analogous to the drum 28, they can be mounted on a reciprocating element or, in general, they can be mounted on any kind of means which provides movement having a component of motion perpendicular to the web of material 18 at the work station and which then removes the probe from the immediate area in order to be heated by the induction heating means.

In the embodiment of FIG. 1, a backup roller 30 is mounted for rotation about its own axis at the work station 20 and on the side of the web of material 18 opposite from the probes 22. The backup roller 30 is provided with a surface against which the web of material 18 is supported as it travels through the work station 20 but into which the individual probes 22 may penetrate. As shown in FIG. 2, the surface 32 may be provided with a series of grooves 34 aligned with the probes 22 on the drum 18. The grooves 34 are deep enough to accommodate the full length of the probes 22. Of course, other kinds of backup devices can be used as well. For example, the surface 32 of the drum 30 could be provided with a series of deep wells rather than grooves. Also, the surface 32 could be of any material which could support a flexible plastic film but yet which would permit the penetration of the probes 22. This could be a highly resilient material, a bristle-like material, a flexible screen material or any other material which will provide a similar type of function.

Both the probe mounting drum 28 and the backup roller 30 are mounted in appropriate bearing means (not specifically shown, but generally indicated, with the sprocket wheels, by the numeral 36). Drive means 38 are provided to move both the drum 28 and the roller 30 in coordinated movement. The drive mechanisms 38 include a motor 40 whose output shaft is connected, through an appropriate sprocket wheel, to a drive chain 42 which, at its other end, is connected to an appropriate sprocket wheel and direction reversing gear unit 36 on the backup roller 30. A second drive chain 44 is interconnected between the backup roller 30 and the probe-mounting drum 28 to ensure that those two rolling elements travel at the same peripheral speed. Appropriate interconnection of the drive means 38 to the feed roller 12 and the takeup roller 14 are provided, although that interconnection is not shown for purposes of simplicity. A pair of guide rollers 16 serve as pinch rollers with the backup roller 30 on either side of the work station 20 in order to ensure that the film material 18 is maintained in contact with the surface 32 of the backup roller 30 in the work station 20 and moves with the required linear speed through the work station 20. As with the other specific structures in the device shown in FIG. 1, the drive means 38 shown herein are merely illustrative and any conventional drive means to accomplish the desired result may be utilized.

A heat induction unit, generally designated by the numeral 50 is mounted at a location immediately adjacent to drum 28 but at a point removed from the work station 20. The induction heating unit 50 comprises a power supply 52 and induction means 54 to form an induction heating field at a location which will be traversed by probes 22 as the drum 28 is rotated. The induction heating unit 50 is of conventional design and can be, for example, the radio frequency type manufactured and sold by Lepel Hi-Frequencies Labs of Woodside, N.Y. Of course, the probes 22 are preferably made of an iron material in order to be efficiently heated by the induction heating unit 50. If desired the probes 22 can be plated with nickel or chrome to maintain a bright appearance. It has been found that probes about 1″ long and about 1/10″ in diameter, with a taper toward the end, generally as shown in FIG. 2, serve quite efficiently. The induction heating unit, which operates in the radio frequency range, can generate temperatures at the probes approximately 700° Fahrenheit although it has also been found that heats several hundred degrees less than that, for example in the range 300° to 550° Fahrenheit, may be used to efficiently perform in accordance with the invention.

Since a full penetration of the film material is not required, for example, a penetration of only 1/16 to 3/16 of an inch has been found to work for some materials, the drum 38 is mounted for movement toward and away from the backup roller thereby to allow for an adjustment of the penetration of the probes 22 into the material 18.

In FIG. 4 there is shown a variation of the device as illustrated in FIG. 1. Specifically, the variation shown in FIG. 4 eliminates the need for any backup roller such as the backup roller 30. In most instances, the elements in FIG. 4 are identical to those shown in FIG. 1 and are marked with the same numbers. It can be seen that the probe-mounting roller 38 is positioned adjacent to the flow path FP. An induction heating unit 50 with a power supply 52 and a coil portion 54 is mounted in operative engagement with the probes on the probe-carrying drum 28. In order to maintain the film 18 in a position such that it is accurately engaged by the individual probes 20 as the drum 28 is rolled, two pairs of pinch rollers 58 are employed on opposite sides of the drum 38 in order to maintain a fixed degree of tension in the film 18 immediately below the drum 28. Drive means, powered by an appropriate motor source such as the motor 40, drive the drum 28 in a first direction through a chain link drive 56 and from the other side of the motor 40 and in the other direction drive the two pairs of pinch rollers 58 through an appropriate chain link assembly designated by the numerals 60, 62, 64.

It will be appreciated that the device shown in FIG. 4 works generally in the same manner as the device shown in FIG. 1 with the exception that there is no backup support for the film material 18 as it flows along the feed path FP and is operated on by the individual probes 22. The material 18 is kept in proper position with respect to the probes 22 by means of the guide rollers 16 along the flow path FP in combination with the pairs of pinch rollers 58.

It has been found that variations in temperature can, to some degree, control the size of the perforations formed in the film material as can variations in the degree of penetration of the probes 22 into the film material. Accordingly, the size of the openings formed in a film can be varied by varying the penetration of the probes, varying the temperature of the probes, varying the thickness of the probes, varying the time of insertion, etc. Of course, different materials, both in thickness and in chemistry, will have different responses.

The apparatus and the process in accordance with the invention is illustrated by considering the following brief description of the operations of the device 10. A supply of thin, flexible thermoplastic film 18 is guided along the flow path 16 and through the work station 20. At the work station 20, the film material is continuously moved and, at the same time, it is supported at a fixed distance relative to the perforating probes 22. The probes 22 are heated at a point remote from the work station 20 by the induction heating unit 50 to a temperature which will cause the thermoplastic film material 18 to melt. The probes 22 are progressively moved into the work station 20 by the probe-mounting drum 28. The probes are moved with a component of motion perpendicular to the plane of the film material 18 to penetrate into the material and are also moved at the same linear speed of the film, thereby to provide the possibility for a continuous process. The perforated material is then withdrawn from the work station 20 for appropriate handling, such as use as raw material in a fabricating machine or a packaging machine or the material is rolled for storge as shown in FIG. 1.

It will be appreciated that in accordance with the present invention a means and method are provided for perforating thermoplastic film material in which the process may be accomplished on a continuous basis, in which there is a capacity for selective variation of perforation patterns and size of perforation and in which an excellent end product results. Although only two illustrative embodiments of a device in accordance with the present invention have been shown in the drawings and described in this specification, a large variety of variations can be easily made by those skilled in the art. Accordingly, the following claims should be construed broadly, consistent with the spirit and scope of the invention.

What is claimed is:

1. An apparatus for forming perforations in a web of thin, flexible, thermoplastic material, comprising a plurality of probes of small cross-sectional diameter, means mounting said probes of small cross-sectional diameter in spaced relation to each other, means defining a flow path for movement of the web of material through a work station, means for progressively moving said probes into said work path at said work station with a component of motion perpendicular to said flow path, induction heating means operatively positioned with respect to said probes for heating at least the ends thereof at a location remote from said work station, and means for supporting a web of material at said work station while it is being perforated by said probes, said probes perforations in the web of material at said work station by transfer of heat from said induction heating unit, said perforations being of a size determined by the temperature of said probes, the degree of penetration of said probes into the web of material and the location and efficiency of said heat sink means.

2. An apparatus in accordance with claim 1 wherein said means for moving said probes comprises a cylindrical drum mounted for rotation about its axis and the probes are mounted thereon in radial extension.

3. An apparatus in accordance with claim 2 wherein said means for supporting a web of material at said work station includes a backup roller, the surface of which is engaged by a web of material at the work station and the surface of which has means to receive said probes.

4. An apparatus in accordance with claim 1 wherein said means for supporting a web of material at said work station includes pinch roller means in said flow path on opposite sides of said work station for tensioning a web of material as it is being perforated by said probes.

5. An apparatus in accordance with claim 2 wherein said means for supporting a web of material at said work station includes pinch roller means in said flow path on opposite sides of said work station for tensioning a web of material as it is being perforated by said probes.

6. An apparatus in accordance with claim 2 wherein said induction heating means operates in the radio frequency range and said probes are heated to a temperature between 300° and 700° Fahrenheit.

References Cited
UNITED STATES PATENTS

| 2,748,863 | 6/1956 | Benton | 83—171 |
| 2,924,863 | 2/1906 | Chavannes | 18—Perforating Digest |
| 3,227,854 | 1/1966 | Ramsey et al. | 83—171 |
| 3,355,974 | 12/1957 | Carmichael | 83—171 |

WILLIAM S. LAWSON, Primary Examiner

U.S. Cl. X.R.

83—171